Nov. 20, 1962 P. J. CADE 3,065,379
AUTOMOBILE HEADLIGHT SAFETY CIRCUITS
Filed July 18, 1960

Inventor
Phillip J. Cade

United States Patent Office 3,065,379
Patented Nov. 20, 1962

3,065,379
AUTOMOBILE HEADLIGHT SAFETY CIRCUITS
Phillip J. Cade, Winchester, Mass., assignor to Electronics Corporation of America, Cambridge, Mass., a corporation of Massachusetts
Filed July 18, 1960, Ser. No. 43,581
9 Claims. (Cl. 315—83)

This invention relates to control apparatus and more particularly to improved control apparatus for automobile headlight circuits.

In the conventional automobile and other similar vehicles there is provided two headlight circuits: a first circuit for high-beam lights which are used for normal driving and a second circuit for low-beam lights which are used where the road is lighted or where there is traffic. These circuits are normally alternatively selectable, either by an automatic photoelectric control device or by a manual switch operated by the driver of the vehicle. As is well known among automobile drivers, the failure of one of these circuits produces a dangerous condition. Switching from a good circuit to a defective circuit, even for a very short interval, may cause the driver to crash into an obstacle unseen during that interval for, for example, may confuse oncoming drivers so that a serious accident results.

Accordingly, it is an object of this invention to provide an improved headlight control apparatus which will prevent a switching of the headlights from a good circuit to a bad circuit through the use of a manually or automatically operative headlight beam circuti controlling switch.

Another object of the invention is to provide an automobile headlight beam safety apparatus in which a good circuit is maintained until the other circuit is established.

Still another object of the invention is to provide automobile headlight beam control apparatus for switching from a first circuit to a second in which the second circuit is tested out and proven to be good before the first circuit is released.

In accordance with the invention there is provided headlight circuit control apparatus for use in a vehicle headlight system having a first high-beam circuit comprising a pair of lamp elements connected in parallel and a second or low-beam circuit including a similar pair of lamp elements also connected in parallel. A source of electrical energy supplies power for operation of these circuits and switch means, which may be either manually operated or electrically operated by automatic "dimming" apparatus, which, for example, controls the application of electrical energy from the source to the high-beam and low-beam circuits in alternate fashion. A relay is associated with each circuit and has a relay operating coil connected in one circuit while the contacts that are operated by the coil are connected in the other circuit. When the switch means is operated the relay coils and their associated contacts are energized so that the previously energized circuit remains established during the interval that the switch is opening one set of contacts and closing a second set and until the circuit to which the system is being switched is established. Only after that time is the first circuit released. Thus, the circuit of the invention avoids loss of energized headlights during the switching operation and further effectively prevents an operation which involves the switching to a dead circuit.

Other objects and advantages of the invention will be seen as the following description of preferred embodiments thereof progress in conjunction with the drawing, in which.

Figure 1:
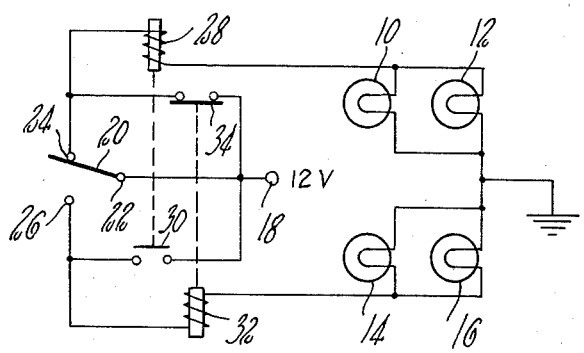
FIG. 1 is a circuit diagram of a first embodiment of the invention which utilizes current responsive relays to provide the desired control function.
Figure 2:
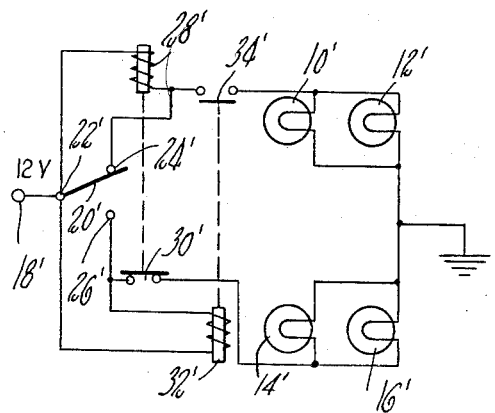
FIG. 2 is a circuit diagram of a second embodiment of the invention which also utilizes current relays.
Figure 3:
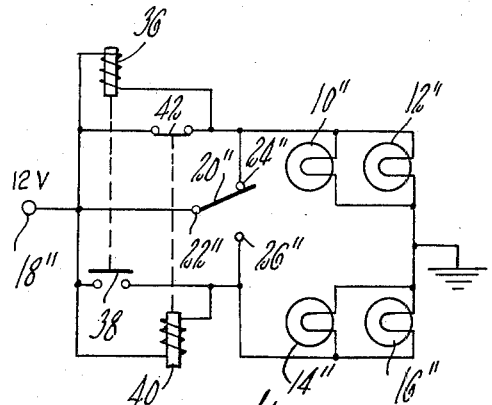
FIG. 3 is a circuit diagram of a third embodiment of the invention which utilizes relay coils of the voltage type.

In FIGS. 1 and 2 the contacts associated with the current relays are of the normally closed type, and in FIG. 3 the contacts associated with the voltage relays are of the normally open type. With reference to FIG. 1 there is shown a first pair of headlight filaments 10, 12 connected in parallel and associated with the high-beam circuit and filaments 14, 16 also connected in parallel, associated with the low-beam circuit. These filaments may be, of course, housed in individual lamps or a set of high-beam and low-beam filaments may be housed in a single lamp. A common terminal of the filament circuits is grounded. A suitable source of electrical energy indicated as 12 volts in magnitude, conventionally supplied by a battery, is applied at terminal 18. A single pole double throw switch element 20 has a terminal 22 connected to source 18 and two contacts 24, 26. The switch 20 operates to connect terminal 22 either with contact 24 or contact 26. Connected in series between the terminal 24 and the high-beam filament circuits is a coil 28 of a current actuated relay which has a pair of normally closed contacts 30 connected between the source terminal 18 and the coil 32 of a current relay associated with the low-beam circuit. In like manner, the contacts associated with relay coil 32 are normally closed contacts connected in series between the source terminal 18 and the relay coil 28.

When the circuit is energized and the switch 20 is in the position shown, a current path is completed between terminal 18 through switch 20 to terminal 24 and coil 28 so that the high-beam filaments 10 and 12 are energized. As current coil 28 is energized the contacts 30 associated with that coil are opened, breaking the circuit between terminal 18 and coil 32 so that no current can flow to the low-beam filaments 14, 16. The contacts 34 associated with relay coil 32 are maintained closed as that relay coil is not energized and provides a safety circuit from terminal 18 through the contacts 34 to the relay coil 28 in parallel with the switch circuit contact 24. This circuit remains effective during the interval switch 20 is being operated to move switch member 20 to contact 26 so that the high-beam filaments 10, 12 remain energized. When switch member 20 makes contact with switch 26 a circuit is completed from terminal 18 to contact 26, thus energizing coil 32 and the low-beam filaments 14, 16. This energizaiton of the coil 32 opens the contacts 34, interrupting the circuit from terminal 18 to the high-beam filaments 10 and 12 and de-energizing coil 28 so that contacts 30 are allowed to close to complete the safety circuit in parallel with contact 26. It will further be noted that if a fault should occur so that the high-beam filament circuit is open with the switch 20 in the position shown in FIG. 1, that fault will cause coil 28 to become de-energized. The de-energization of coil 28 will permit contact 30 to close and a circuit from terminal 18 through contact 30 and coil 32 will be completed to automatically energize the low-beam filaments. With the energization of coil 32 contacts 34 are opened and the defective high-beam circuit is held open thereafter. Any attempt to operate switch 20 will be ineffective and the low-beam circuit will be maintained until the defect in the high-beam circuit is corrected.

A second embodiment of the invention is shown in FIG. 2 utilizing similar components in a different arrangement. Thus there are shown in FIG. 2 high-beam filaments 10', 12' and low-beam filaments 14', 16'. A voltage source 18' is connected through a switch member 20' which is operated between contacts 24', 26' to exercise the general supervision over which of the two headlight beam circuits is to be energized. A relay coil 28' is connected in parallel with the switch member 20' and contact 24' and its associated normally closed contacts 30' are connected in series between terminal 26' and the low-beam filament circuit. Similarly, a relay 32' is connected across the terminal 22' and terminal 26' and its associated normally closed contacts 34' are connected in series with high-beam filament circuit.

In operation, with the switch 20' in the position shown in FIG. 2 the coil 28' is shorted by the switch contacts so that contacts 30' are closed in this position. A circuit is provided from terminal 18' through coil 32' and closed contacts 30' to energize the low-beam filaments 14', 16'. The energized coil 32' opens contact 34' and maintains that high-beam filament circuit open. When the switch 20' is operated, the circuit remains in the same state until switch member 20' makes contact with 26' at which time relay coil 32 is shorted to de-energize that coil and close contacts 34'. This operation completes the circuit through relay coil 28' to energize the high-beam circuit. With the energization of the high-beam circuit the relay 28' is energized to operate the contacts 30' and open the low-beam circuit. Thus the first circuit that has been energized is not de-energized until the other circuit is made and proved out by the current flow through it. At that time only is the first circuit released. If the low-beam circuit should open with the switch 20' in the position shown in FIG. 2, the relay 32' will become de-energized and allow contacts 34 to close so that a path is provided from terminal 18 through switch member 20' and contact 24' and the presently closed contacts 34' to the high-beam circuit. Thus the circuit automatically switches from one circuit to the other upon the open failure of one circuit.

A third embodiment of the invention is shown in FIG. 3. This embodiment utilizes voltage responsive relay coils rather than current actuated relay coils. In this embodiment there are shown similarly high-beam filaments 10", 12" and low-beam filaments 14", 16". A terminal 18" for a suitable energy source is provided and a switch 20" connects terminal 22" to one of the contacts 24", 26". The voltage relay 36 is connected in series between terminal 18" and the high-beam circuit. The contacts 38 associated with this voltage coil are normally open contacts and are connected in series between the terminal 18 and low-beam circuit. Similarly voltage coil 40, having normally open contacts 42, is connected in the series low-beam circuit and the contacts 42 are connected in series with the high-beam circuit. Thus the contacts 38 associated with relay coil 36 are connected in parallel with the voltage coil 40 in the low-beam circuit, and the contacts 42 in like manner are connected in parallel with the voltage coil 36 in the high-beam circuit. It will be noted that the switch member 20" is also connected in parallel with voltage coils 36 and 40.

In operation, with the switch member 20" in the position shown in FIG. 3, the relay coil 36 is shorted so that no voltage appears across that coil and a direct path is provided through the contact member 20" to the high-beam circuit. At the same time a current path is provided across through relay 40 to the low-beam circuit. However substantially the complete voltage drop in that circuit occurs across the coil 40 so that the low-beam filaments are not illuminated as coil 40 is energized, the contacts 42 are closed to provide a safety circuit in parallel with the switch element 20". When the switch 20" is moved to break the switch circuit through contact 24" the high-beam circuit remains established through contacts 42 until the switch member 20" makes with contacts 26". At the time the voltage coil 40 is shorted and its contacts 42 drop out and turn off high-beam circuit. With the turn off of the high-beam circuit as the two parallel circuits which have been shorting coil 36 are opened battery voltage appears across coil 36 to operate that coil and close the contacts 38, which provides a safety circuit across the switch 20" and contact 26".

The invention thus provides automobile headlight safety circuits which enable operation of the headlight beam controlling switch without any interruption of headlight illumintaion. When the beam circuit switch is actuated to switch from one circuit to the other, the circuit switched from is not released until the other circuit is made and proves to be good. In addition the circuits of the invention enable automatic switching from a defective circuit to the good circuit without operation of the controlling switch.

While there have been shown and described preferred embodiments of the invention, it will be understood by those skilled in the art that various modifications may be made therein, and therefore it is not intended that the invention be limited to the disclosed embodiments or to details thereof, and departures may be made therefrom within the spirit nad scope of the invention as defined in the claims.

I claim:

1. Automobile headlight control apparatus for association with an automobile headlight system having a high-beam circuit including a pair of lamp filaments connected in parallel and a low-beam circuit including a second pair of lamp filaments connected in parallel, a source of electrical energy connected in circuit to supply electrical energy to said high-beam circuit and said low-beam circuit, double pole switch means having a common terminal connected to said source of electrical energy and first and second switch terminals connected to said high beam circuit and said low beam circuit respectively for selectively controlling the application of electrical energy from said source to either one of said circuits, first relay means including an actuating coil connected in series between said source and the filaments in said high beam circuit and a set of contacts operated by said actuating coil connected in series between a series in said source and the filaments in said low beam circuit, second relay means including an actuating coil connected in series between said source and the filaments in said low beam circuit and a set of contacts operated by siad actuating coil connected between said source and the filaments in said high beam circuit, said double pole switch means being connected in parallel with an element of each of said relays so that it shorts out that element when it is operated to apply electrical energy from said source to the lamp filaments to which that relay element is connected, each said set of relay contacts being connected to provide an electrical circuit between said source and the lamp filaments to which it is connected independently of the other set of relay contacts so that a filament circuit is not interrupted during the interval of operation of said switch means for selection of the other circuit until the lamp filaments in the other circuit are energized, making it possible to switch between headlight circuits uninterruptedly.

2. The apparatus claimed in claim 1 wherein said actuating coils are current responsive coils connected in series with said switch means between said source and the headlight beam filaments of the associated circuit, and the relay contacts operated by each coil are normally closed contacts connected in series with the actuating coil associtaed with the other circuit and in parallel with the said switch.

3. The apparatus as claimed in claim 1 wherein each said actuating coil is connected in parallel with said switch means and the contacts associated with each coil are normally closed contacts connected in series between the other coil and the filament circuit that is energized when that coil is energized.

4. The apparatus as claimed in claim 1 wherein each said actuating coil is a voltage responsive relay coil and is connected in series between said source and the associated filament circuit, and the set of contacts operated by each coil is connected in parallel with the other coil and in parallel with said switch means.

5. The apparatus as claimed in claim 1 wherein said double pole switch means is connected in parallel with the actuating coil in each said circuit so that on operation to apply electrical energy from said source to either of said circuits it shorts out the actuating coil connected in series in that circuit.

6. The apparatus as claimed in claim 1 wherein said switch means is connected in parallel with the set of relay contacts in each said circuit so that on operation to apply electrical energy from said source to either of said circuits it shorts out the set of relay contacts connected in series in that circuit.

7. Control apparatus for association with motor vehicle headlight system comprising a source of electrical energy, first and second headlight circuits, each circuit including a headlight, switch means interposed in circuit between said source of electrical energy and said first and second headlights for selectively applying electrical energy from said source to either one of said headlights, first relay means including an electrical signal responsive element connected in said first circuit between said source and the headlight in that circuit, and a first circuit completing element controlled by said first electrical signal responsive element connected in said second circuit between said source and the headlight in that circuit, second relay means including a second electrical signal responsive element connected in said second circuit between said source and the headlight in that circuit, and a second circuit completing element controlled by said second electrical signal responsive element connected in said first circuit between said source and the headlight in that circuit, each said circuit completing element being connected to provide an electrical circuit between said source of electrical energy and the headlight to which it is connected independently of the other circuit completing element so that each circuit completing element continues to maintain the energization of the headlight to which it is connected once that headlight has been energized by operation of said switch means until the other headlight is energized by operation of said switch.

8. The apparatus as claimed in claim 7 wherein said switch is connected in parallel with the circuit completion element in each said circuit so that when it is operated to select a circuit it shorts out the circuit completing element in that circuit.

9. The apparatus as claimed in claim 7 wherein said switch is connected in parallel with the electrical signal responsive element in each circuit so that when it is operated to select a circuit it shorts out the electrical signal responsive element in that circuit.

References Cited in the file of this patent

UNITED STATES PATENTS

| | | |
|---|---|---|
| 2,342,639 | Bradley | Feb. 29, 1944 |
| 2,467,293 | Chubb | Apr. 12, 1949 |
| 2,603,673 | Brake | July 17, 1952 |
| 2,626,373 | Echlin et al. | Jan. 20, 1953 |
| 2,693,551 | Hall | Nov. 2, 1954 |

UNITED STATES PATENT OFFICE
CERTIFICATE OF CORRECTION

Patent No. 3,065,379                                                              November 20, 1962

Phillip J. Cade

It is hereby certified that error appears in the above numbered patent requiring correction and that the said Letters Patent should read as corrected below.

Column 1, line 24, for "interval for" read -- interval or --; line 31, for "circuti" read -- circuit --; column 4, line 20, for "nad" read -- and --; line 39, strike out "a series in"; line 43, for "siad" read -- said --.

Signed and sealed this 21st day of May 1963.

(SEAL)
Attest:

ERNEST W. SWIDER
Attesting Officer

DAVID L. LADD
                                                                                       Commissioner of Patents